United States Patent Office 3,268,534
Patented August 23, 1966

3,268,534
PIPERAZINE DERIVATIVES
Joseph Albert Meschino, North Wales, Pa., assignor to McNeil Laboratories, Incorporated, a corporation of Pennsylvania
No Drawing. Filed July 28, 1964, Ser. No. 385,794
2 Claims. (Cl. 260—268)

This is a continuation-in-part of application Serial No. 103,985, filed April 19, 1961, now U.S. Patent No. 3,185,707.

This invention relates to a new series of organic compounds represented by the following general formula

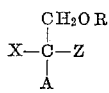

and methods for their preparation.

Z in the above general formula stands for nitrile or carboxamide, and A represents aryl, substituted aryl or hydrogen. Aryl includes monocyclic aryl, such as phenyl and fused rings, such as naphthyl which may be substituted by lower alkyl, lower alkoxy, amino, halo or aminoalkyl groups.

In the above general formula, X stands for 4-benzyl-piperazino - loweralkyl, 4 - loweralkylbenzylpiperazino-loweralkyl or 4-di-loweralkylbenzylpiperazino-loweralkyl.

R in the above general formula represents hydrogen; amino carbonyl wherein the amine group is primary, secondary or tertiary; or an acyl function. Examples of such substituents include lower alkylaminocarbonyl, di-lower alkylaminocarbonyl, i.e. dimethylaminocarbonyl, diethylaminocarbonyl, N-cyclopentyl-N-methylaminocarbonyl, N-benzyl-N-methylaminocarbonyl, pyrrolidinocarbonyl, piperidinocarbonyl 4-methyl-piperidinocarbonyl, morpholinocarbonyl, thiamorpholinocarbonyl, piperazinocarbonyl, or 4-methylpiperazinocarbonyl. Examples of acyl groups include radicals of aromatic, aliphatic, heterocyclic or araliphatic carboxylic acids, such as a lower fatty acid, e.g. acetic or propionic; a phenyl carboxylic acid, e.g. alkoxyphenyl carboxylic acid, such as 4-methoxy benzoic acid; 3,4-dimethoxybenzoic acid; 3,4,5-trimethoxybenzoic acid; 3,4-methylenedioxy benzoic acid; syringic acid; O-carbalkoxy-syringic acid; alkoxyphenyl aliphatic carboxylic acid, e.g. alkoxycinnamic acid.

A variety of methods may be employed for the preparation of the novel compounds of this invention. However, a particularly useful and unique method has been found which is superior and is distinguishable from those presently known. It is intended that this method be included in the scope of the present invention. In a general way, the novel process comprises reducing the appropriate nitrile ester with a hydrogenating agent in the presence of an organic solvent, if so desired, to obtain the corresponding alcohol. Preferred reducing agents for this purpose are the metal hydrides, such as lithium aluminum alkoxy hydrides, e.g. lithium aluminum tritertiary butoxy hydride, lithium aluminum triethoxy hydride, or lithium aluminum triisopropoxy hydride; alkali metal borohydrides, e.g. potassium borohydride, sodium borohydride, or lithium borohydride; diboranes and substituted boranes, such as alkyl-substituted boranes. Suitable as solvents for the reduction reaction are the inert organic or water miscible organic solvents, such as the lower alkanols, e.g. methanol, ethanol, or preferably 2-propanol. Alternatively, tetrahydrofuran, ether, diaxane, benzene, toluene, xylene or di-n-butyl ether may be employed.

Those compounds in the novel series wherein Z represents carboxamido may be obtained by hydrolysis of the corresponding nonester-bearing nitrile alcohols with an appropriate hydrolytic agent, such as sulfuric acid, phosphoric acid, hydrochloric acid, alkali metal hydroxides, such as sodium hydroxide and potassium hydroxide or, preferably, hydrogen peroxide in the presence of a mild base such as an alkali metal hydroxide carbonate or bicarbonate. Further, the carbamoyl nitrile and carbamoyl amide derivatives are obtained by treating the alkanolic nitrile, or its functional derivative, i.e. carboxamide, with a reactive ester of a lower alkanol, e.g. a lower alkylcarbamate, such as ethylcarbamate, in the presence of an aluminum alkoxide, e.g. aluminum isopropoxide and an organic solvent, such as toluene, benzene, xylene, hexane, heptane, tetrahydrofuran, carbon tetrachloride, chloroform, chlorobenzene, diethylether or dioxane.

Alternatively the carbamate series of the novel compounds of this invention may be prepared by reacting the appropriately substituted hydroxymethyl compound, i.e. one wherein, in the above general formula, R stands for hydrogen, successively with phosgene and ammonia.

Still another novel method which is intended to be included within the scope of the present invention relates to the preparation of those compounds of the present series wherein R is hydrogen and Z is nitrile by treating the appropriately disubstituted acetonitrile with formaldehyde in the presence of a weak base such as calcium oxide, alkali metal carboxate or bicarbonate or triethylamine.

The novel compounds of this invention are useful as central nervous system depressants. They may be used in admixture with suitable nontoxic solid or liquid carriers in the form of tablets, pills, capsules, or in the liquid form, such as solutions, suspensions or emulsions. They may be admixed, if desired, with other compatible and physiological substances.

The following examples are intended to illustrate, but not to limit, the scope of the invention.

Example I 1-(m-methylbenzyl)piperazine, 29 parts by weight, and ethyl ethoxymethylenecyanoacetate, 26.5 parts by weight, are refluxed in 100 parts by volume of heptane for a period of eight hours. The ethyl-alpha-cyano-beta-[4-(m-methylbenzyl)piperazino]acrylate crystallizes on cooling. Filtration on recrystallization gives 30 parts by weight of material, melting at 105° C.–107° C.

To a stirred, cooled suspension of 3.6 parts by weight of sodium borohydride in 25 parts by volume of 2-propanol is added slowly 10 parts by weight of solid ethyl alpha-cyano-beta-[4-(m-methylbenzyl)piperazino]acrylate. The mixture is stirred for about eight hours at room temperature, after which the excess borohydride is destroyed with dilute hydrochloric acid. The resulting mixture is concentrated under reduced pressure to remove most of the 2-propanol. The residue is made basic with potassium carbonate and concentrated to dryness to give alpha-hydroxymethyl - beta - [4 - (m - methylbenzyl)piperazino] propionitrile. The residue is converted to its crystalline hydrochloride which melts at about 279° C.

Example II

Benzylpiperazine, 29 parts by weight, and ethyl ethoxymethylenecyanoacetate, 26.5 parts by weight, are refluxed in 100 parts by volume of heptane for a period of eight hours. The ethyl alpha-cyano-beta-benzylpiperazino acrylate is recovered from the solution.

To a stirred, cooled suspension of 3.6 parts by weight of sodium borohydride in 25 parts by volume of 2-propanol is added slowly 10 parts by weight of ethyl alpha-cyano-beta-benzylpiperazino acrylate. The mixture is stirred at room temperature for about eight hours, after which the excess borohydride is destroyed with dilute hydrochloric acid. The resulting mixture is concentrated under reduced pressure to remove most of the 2-propanol. The residue is made basic with potassium carbonate and concentrated to dryness to give alpha-hydroxymethyl-beta-benzylpiperazino propionitrile.

*Example III*

4-(3,4-dimethylbenzyl)piperazine, 29 parts by weight, and ethyl ethoxymethylenecyanoacetate, 26.5 parts by weight, are refluxed in 100 parts by volume of heptane for a period of eight hours. The ethyl alpha-cyano-beta-[4-(3,4-dimethylbenzyl)piperazino]acrylate is recovered from the solution.

To a stirred, cooled suspension of 3.6 parts by weight of sodium borohydride in 25 parts by volume of 2-propanol is added slowly 10 parts by weight of ethyl alpha-cyano - beta - 4 - (3,4-dimethylbenzyl)piperazino acrylate. The mixture is stirred for about eight hours at room temperature, after which the excess borohydride is destroyed with dilute hydrochloric acid. The resulting mixture is concentrated under reduced pressure to remove most of the 2-propanol. The residue is made basic with potassium carbonate and concentrated to dryness to give alpha-hydroxymethyl - beta - 4 - (3,4-dimethylbenzyl)piperazino propionitrile.

*Example IV*

A mixture of 11.7 parts by weight of alpha-hydroxymethyl-beta-(4-benzylpiperazino)propionitrile, 4.6 parts by weight of ethyl carbamate and 1 part by weight of aluminum isopropoxide in 100 parts by volume of toluene is brought to reflux under an asbestos jacketed Vigreux column and distillation effected until the head temperature reaches 110° C. Refluxing is continued for one hour, after which most of the toluene is removed under reduced pressure.

The residue is taken up in methylene chloride, washed with water and dried over anhydrous magnesium sulfate. The solvent is removed to give alpha-carbamoyloxymethyl-beta-(4-benzylpiperazino)propionitrile.

*Example V*

A mixture of 25.9 parts by weight of alpha-hydroxymethyl-beta-(4-benzylpiperazino)propionitrile and 125 parts by volume of 20 percent hydrogen peroxide is made homogeneous with acetone. To this is added 30 parts by volume of a 10 percent solution of sodium carbonate and the mixture is stirred for three days at room temperature.

After destroying the excess peroxide with platinum, the mixture is concentrated under reduced pressure. The reaction product is alpha-hydroxymethyl-beta-(4-benzylpiperazino)propionamide.

*Example VI*

A mixture of 11.7 parts by weight of alpha-hydroxymethyl-beta-(4-benzylpiperazino)propionamide, 3.8 parts by weight of ethyl carbamate and 0.5 part by weight of aluminum isopropoxide in 20 parts by volume of toluene is brought to reflux under an asbestos jacketed Vigreux column and distillation effected until the head temperature reaches 110° C. Refluxing is continued for one hour, after which most of the toluene is removed under reduced pressure. The reaction product is alpha-carbamoyloxymethyl-beta-(4-benzylpiperazino)propionamide.

*Example VII*

A mixture of 25.9 parts by weight of alpha-hydroxymethyl-beta-(4-benzylpiperazino)propionitrile and 11.9 parts by weight of phenylisocyanate is heated on a steam bath for a period of thirty minutes, after which it is triturated and washed with ligroin. The reaction product is alpha-(N-phenylcarbamoyloxymethyl)-beta-(4-benzylpiperazino)propionitrile.

What is claimed is:

1. A compound of the formula

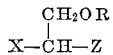

wherein Z is a member of the group consisting of nitrile and carbamoyl; X is a member of the group consisting of 4-benzylpiperazino-loweralkyl, 4-loweralkylbenzylpiperazino - loweralkyl and 4 - di - loweralkylbenzylpiperazino-loweralkyl; and R is a member of the group consisting of hydrogen, carbamoyl and N-phenyl carbamoyl.

2. The compound alpha-hydroxymethyl-beta-[4-(m-methylbenzyl)piperazino]propionitrile.

No references cited.

HENRY R. JILES, *Acting Primary Examiner.*

JAMES W. ADAMS, *Assistant Examiner.*